United States Patent [19]

Kobayashi et al.

[11] Patent Number: 5,275,855
[45] Date of Patent: Jan. 4, 1994

[54] STRIPPING PAPER AND ADHESIVE SHEET WITH STRIPPING PAPER

[75] Inventors: Junichi Kobayashi, Tokyo; Sakae Oguni, Gotenba, both of Japan

[73] Assignee: Ko-Pack Kabushiki Kaisha, Tokyo, Japan

[21] Appl. No.: 820,853

[22] PCT Filed: May 17, 1991

[86] PCT No.: PCT/JP91/00653
§ 371 Date: Jan. 16, 1992
§ 102(e) Date: Jan. 16, 1992

[87] PCT Pub. No.: WO91/18068
PCT Pub. Date: Nov. 28, 1991

[30] Foreign Application Priority Data

May 17, 1990 [JP] Japan .................................. 2-125393

[51] Int. Cl.$^5$ ............................................. A61F 13/02
[52] U.S. Cl. ............................ 428/40; 428/352; 428/145; 428/449; 428/537.5
[58] Field of Search ............ 428/145, 447, 448, 449, 428/537.5, 40, 352

[56] References Cited

U.S. PATENT DOCUMENTS

4,056,661  11/1977  Sato et al. ........................... 428/144

FOREIGN PATENT DOCUMENTS

59-47278   3/1984  Japan .
60-18564   1/1985  Japan .
62-197483  9/1987  Japan .

*Primary Examiner*—George F. Lesmes
*Assistant Examiner*—Chris Raimund
*Attorney, Agent, or Firm*—Frishauf, Holtz, Goodman & Woodward

[57] ABSTRACT

Stripping paper which serves as a member for protecting the adhesive of an adhesive sheet is capable of being recycled and effectively used as a material of regenerated paper after stripped when the adhesive sheet is used, and permits beautiful printing thereon. It also provides an adhesive sheet having the stripping paper attached thereto and exhibiting new additional printing effects. In the stripping paper comprising a substrate 10, a coating layer of mineral substance 12 and a silicone film layer 13, the substrate 10 is made of relatively long fiber material, the coating layer 12 provides a smooth surface suitable for application of printing on the substrate 10 and comprises relatively fine mineral particles 11 to substantially prevent infiltration of the silicone 13a into the substrate (FIG. 1).

6 Claims, 2 Drawing Sheets

STRIPPING PAPER AND ADHESIVE SHEET WITH STRIPPING PAPER

TECHNICAL FIELD

The present invention relates to improvement on stripping paper, and more particularly to improvement on stripping paper which serves as a member for protecting the adhesive of a sheet material to be pasted on an object by means of the adhesive, such as labels known as a self-adhesive label that is pasted on a product or a product container, or transfer papers for prints. It also relates to an adhesive sheet having the improved stripping paper attached thereto.

BACKGROUND OF THE INVENTION

By being pasted on the back of a sheet material such as label and transfer paper via an adhesive layer, the prior art stripping paper is primarily intended to protect said adhesive as it is releasably adhered to the adhesive. The stripping paper is coated with a polymer silicone film or special resin film over the entire surface on the side which contacts said adhesive in order to achieve such effect.

As the prior art stripping papers coated with a silicone film, there have been known those having substrates made of densely arranged short fibers such as specially treated kraft paper and super-calendered glacin paper which can prevent a large amount of relatively expensive silicone from infiltrating into the tissue of the paper, and can save the amount of silicone.

As another example of the prior art stripping paper, it is known to laminate a polyethylene film of about 12-14 $\mu$m thickness on a sheet of kraft paper to prevent infiltration of silicone into the tissue, to cut down cost and to improve the product quality.

As a stripping paper for adhesive labels is releasably adhered to the label by a stripping layer such as a silicone film and a special film, it is essentially expected to function as a support for the label until the label is peeled off and pasted on an object article, and is therefore made to be easily stripped off from the silicone film or the adhesive on the label. After the label is pasted on an object article, the stripping paper will no longer have its use and is usually discarded and put to incineration.

In an attempt to allow an adequate amount of expensive silicone to be impregnated or to prevent wasteful use of such expensive silicone or high quality paper as the substrate that are often used in a stripping paper, extra treatment such as laminating a polyethylene film is conducted, entailing far greater production cost than is required in the manufacture of ordinary paper products. It is therefore a grave problem in terms of effective utilization of resources that such expensive stripping paper is discarded wastefully after a label to which the stripping paper is bonded is put to use.

Therefore, a means or method of some sort should be developed to make full use of the stripping paper, and there are two conceivable means. For one, left-over stripping paper may be recycled and used as a regenerated paper after an adhesive sheet such as a label is used. Alternatively, a stripping paper which has heretofore been discarded as a blank sheet without being used as a medium for printing may be printed with information to be conveyed to consumers, like the labels.

Recycling of prior art stripping paper for use as regenerated paper is disadvantageous in that it is very difficult to dissolve the recycled stripping paper during regeneration process when compared with other types of paper because glacin paper or kraft paper of relatively short fibers used as substrate is calendered during the manufacturing process to compact the fibers to impart it an adequate strength and to thereby minimize infiltration into the substrate of expensive silicone which is coated on the surface.

Even if the stripping paper comprising a substrate of such quality paper does become dissolved, short fibers easily get washed off during the regeneration process, significantly lowering the fiber recovery ratio and thus the yield of regeneration.

To ensure firm adhesion of silicone layer on the substrate made of compacted short fibers, an intermediate bonding layer of relatively coarse mineral particles having the particle size of about 2.0 $\mu$m such as particles of kaolin (:$H_2Al_2Si_2O_8H_2O$) or calcium carbonate (:$CaCO_3$) is applied on the surface of the substrate, and silicone is applied on this mineral particle layer. Because of relatively large particle size, the resulting interlaminar layer has a sufficient thickness, and when liquid silicone is applied on the surface of this mineral particle layer 2 to form a silicone film layer 3 as shown in FIG. 5, the liquid silicone would infiltrate into the tissue of the substrate 1 through the interstices between the particles and form branches 3a of silicone to bite into the tissue and enhance bonding of the silicone layer 3 with the substrate 1. This biting and bonding of the silicone into and with the substrate fibers makes it more difficult to dissolve the fibers during the regeneration process.

Moreover, a polyethylene film laminated on the surface of the substrate would remain as a foreign matter when the stripping paper is being treated for regeneration. Because of these problems, the prior art stripping paper has been considered totally unsuitable for recycling and regeneration and has therefore been disposed of by incineration.

Use of a stripping paper as a medium for printing is practically impossible as the silicone or polyethylene film is applied on the surface. Although it is possible to print on the surface of the substrate before applying a silicone film layer thereon as far as printing is concerned, the prior art stripping paper is, as described above, provided with a coating layer of relatively large mineral particles to give adequate bonding strength between the silicone film and the substrate which is made of compacted fibers, and the mineral coating layer lacks surface smoothness as the particle size of the mineral is relatively large, and when printed, the resultant printed surface becomes inferior in quality.

DISCLOSURE OF THE INVENTION

The primary object of the present invention is to solve the problems encountered in the prior art stripping paper, and more specifically, to provide a stripping paper which protects the adhesive layer on a sheet member such as labels and transfer papers that are to be pasted on an object article via the adhesive applied on the back face and which can be effectively recycled and used as a regenerated paper after it is peeled off from the sheet material upon use of such sheet.

Another object of the present invention is to provide a stripping paper which allows a presentable printing such as seen on a label to be made thereon and to thereby provide a combination of printed label and stripping paper having additional effect of beautiful printing.

According to a basic embodiment of the present invention, a stripping paper comprising a substrate made of relatively long fibers such as those used in the ordinary coat paper, a mineral coating layer and a silicone film layer. The present invention is characterized in that said coating layer is made of relatively fine mineral particles to provide a smooth surface suitable for printing and to substantially prevent infiltration of said silicone into the substrate.

The coating layer of relatively fine mineral particles is firmly bonded with the substrate with an adequate strength as the particles are firmly held in place by virtue of the relatively long fibers of the substrate material. This coating layer acts to retard infiltration of the liquid silicone into the layer of mineral particles before the silicone film becomes hardened on the mineral coating layer itself, so that when said silicone layer is hardened, the tip of the silicone branches would barely reach the substrate, and even if they do reach, they are held at a very shallow region of the substrate near the surface. In other words, said coating layer functions as a blocking against infiltration of the silicone into the substrate. Not only is infiltration of the silicone into the substrate tissue inhibited, but also the coating layer carrying the hardened silicone film can be easily separated from the substrate during the regeneration process, enabling effective recovery of the tissue from the dissolved substrate.

According to a preferred embodiment, said silicone film is obtained by hardening a solvent-free silicone film with ultraviolet or electron beam. The timing for hardening the silicone film is optimally controlled depending on the particle size and density of said mineral coating layer as well as the thickness thereof. By so treating, it becomes possible to use an automated production line for continuous manufacture of stripping paper in which infiltration of the silicone into the substrate is substantially inhibited. Said solvent-free silicone film is preferably formed using 0.5 g or more of silicone per square meter. When the amount is below 0.5 g/m$^2$, the product stripping paper may not be adequately stripped off from the adhesive.

According to another preferred embodiment, the surface of said mineral coating layer is printed in advance, and the silicone film will cover the entire surface of the mineral coating layer including said printed area. Because the surface of the mineral coating layer before application of the silicone film is smooth and flat as the mineral particles used are very fine, different types of printing method such as used for ordinary coat paper can be used to give printings with excellent ink adhesion and beautiful appearance. Because a silicone film will be applied and hardened on the printed area, printing ink to be used preferably includes those which have better affinity with the silicone film and contain pigments that will not dissolve in the silicone film.

According to the present invention, the mineral particle is preferably in the range of from 0.1 to 1.0 μm in size and includes fine powder of kaolin or calcium carbonate that are generally used as a coating material for paper materials. Particles smaller than 0.1 μm would settle into the substrate too easily and excessively inhibit infiltration of the silicone, possibly making adhesion of the silicone film insufficient. Mineral particles larger than 1.0 μm would result in an increased void ratio in the mineral coating layer and possibly deteriorate its function to block said filtration of the silicone.

According to still another preferred embodiment of the invention, the substrate covered with said mineral coating layer constitutes a coat paper of total basis weight of 70 g/m$^2$ and of the air permeability of 6000 sec/100 cc. When compared with the glacin paper of the same basis weight used in the conventional stripping paper, the coat paper contains fibers that are 5 to 6 times longer and exhibits sufficient strength without the need to compact the fibers as is done with the glacin paper of short fibers. The substrate of such stripping paper will dissolve during the regeneration process 3 to 4 times as much as the prior art.

The present invention also offers adhesive sheets such as labels and transfer papers which use the stripping paper having the above mentioned features. A sheet material whose surface is printed and whose back face is coated with an adhesive is laminated with the stripping paper according to the present invention on the silicone film thereof by means of said adhesive on the sheet material. According to one preferred embodiment, an adhesive sheet provided with the stripping paper includes a mineral coating layer which is printed. The stripping paper containing said printed area of the mineral coating layer is provided with perforations made by die-cutting. The sheet material laminated on the stripping paper contains an area circumscribed by another die-cut perforations within said first region defined by the perforations. By stripping off the stripping paper, the adhesive sheet according to the present invention will be left with the region containing said printed area on its back face. By pasting the sheet material onto an object article by means of the adhesive applied on the back face face of the sheet, said region with printed area will come in between the object article and the back face of the sheet material but hidden by the latter. Said printed area will be exposed to the consumers only when said inner region of the sheet material is stripped off along the perforations. It goes without saying that this inner region of the sheet material can be used as a coupon and the like after being stripped off.

These and other features of the present invention will become apparent from the following description of the preferred embodiments taken in conjunction with the accompanying drawings.

OPTIMUM MODES TO REALIZE THE INVENTION

Figure 1:
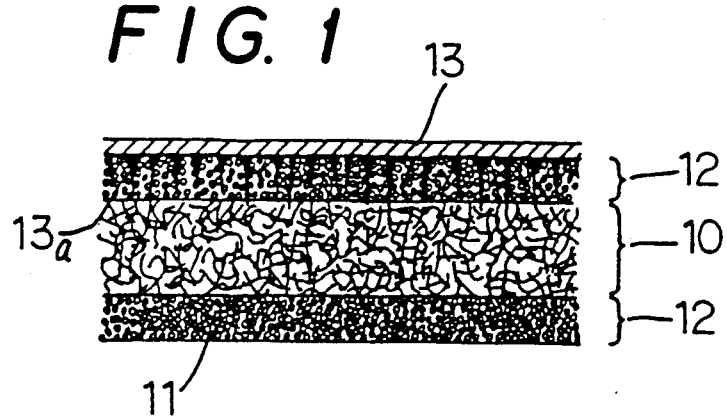
FIG. 1 is an enlarged schematic view to show the laminar structure of the stripping paper according to the present invention.

Referring to FIG. 1, the stripping paper according to one embodiment of the present invention comprises a substrate 10, mineral particle coating layers 12 respectively formed on both the front and the back faces of said substrate 10, and a silicone film layer 13 formed on the surface of one of the mineral particle coating layers 12.

The substrate 10 comprises a paper material of about 55 μm thickness and of relatively long fibers. At the front and the back faces of the substrate is formed a mineral particle coating layer 12 each by ultrasonic treatment to a thickness of about 12 μm using mineral particles 11 of pulverized kaolin or calcium carbonate having an extremely small particle size of 0.1 to 1.0 μm. The substrate 10 and the mineral particle coating layers 12 on both faces thereof constitute a coat paper which satisfies the conditions of air permeability of 6000 sec/100 cc or more and total basis weight of 70 g/m² or more.

On one of the faces of the coat paper is formed a silicone film 13 by applying and hardening a solvent-free silicone. The solvent-free silicone is applied in an amount of 0.5 g/m² using a multi-roll coating method to obtain a substantially uniform film 13 of 1.0 μm or less in thickness. The silicone film thus applied is exposed to ultraviolet or electron beam irradiation for a very brief period of 2 to 6 seconds immediately after application.

Silicones to be applied on the surface of the mineral particle coating layer 12 includes solvent-free silicone and solvent-type silicone. However, a solvent-free silicone that can be hardened by ultraviolet or electron beam irradiation is more preferable because the timing of hardening process can be freely selected, the time required for hardening is short, safety and sanity of the working environment can be assured, and pollution of the environment is avoided.

By applying the solvent-free silicone under the conditions as mentioned above, a silicone film 13 of substantially uniform thickness can be formed on the entire surface of the coating layer 12 comprising ultrafine mineral particles 11.

At the same time, a portion of the silicone infiltrates into the coating layer 12. Branches of silicone 13a extend toward the substrate 10 through the coating layer 12 as the silicone infiltrates thereinto. Infiltration of the silicone proceeds at a very gradual rate as it is retarded by the relatively dense layer of extremely fine mineral particles 11 present in the coating layer 12. Ultraviolet or electron beam is irradiated before the silicone branches 13a extend deeply into the substrate, so that when the silicone film 13 is hardened the silicone branches 13a barely reach the substrate, or even if they did reach the substrate, only the very tip of the branches will slightly go into the substrate.

So far as inhibiting infiltration of the silicone into the substrate is concerned, the coating layer 12 may comprise particles of larger diameter and may be formed thicker. However, a thicker coating layer 12 means a thinner substrate 10 for the difference, unfavorably resulting in reduced strength of the stripping paper. Use of mineral particles having larger particle size is also defective in that the resultant coating layer will have a coarse surface which is unsuitable for obtaining beautiful printing.

Figure 2:
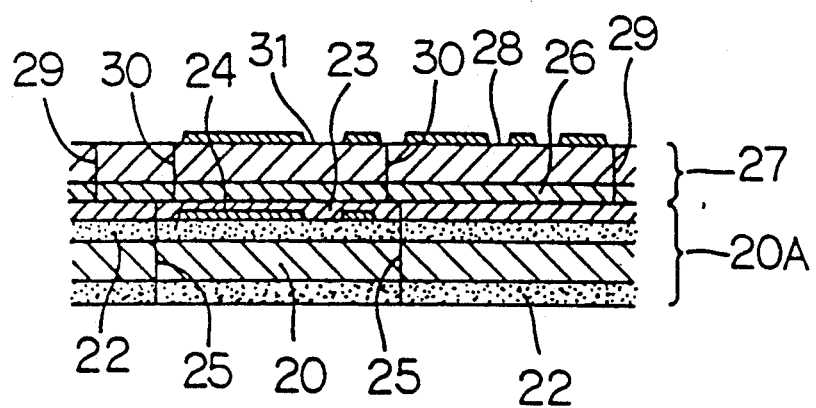
FIG. 2 is an enlarged schematic view to show the laminar structure of an adhesive sheet having the stripping paper of the present invention.
Figure 5:
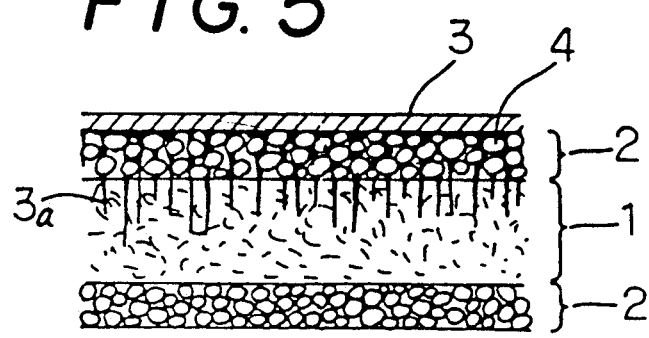
FIG. 5 is an enlarged schematic view to show the laminar structure of the prior art stripping paper.
Figure 3:
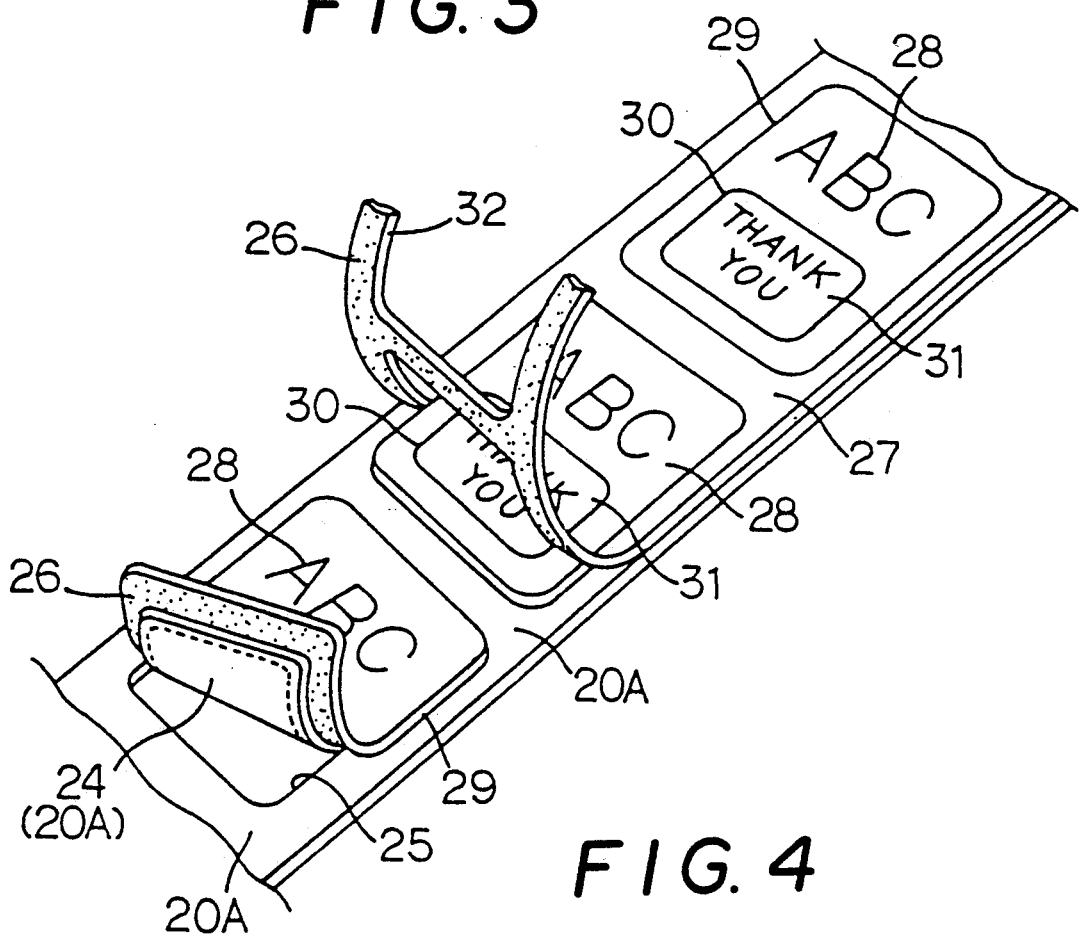
FIG. 3 shows the arrangement and construction of labels on the adhesive sheet having the stripping paper of the present invention shown in FIG. 2.
Figure 4:
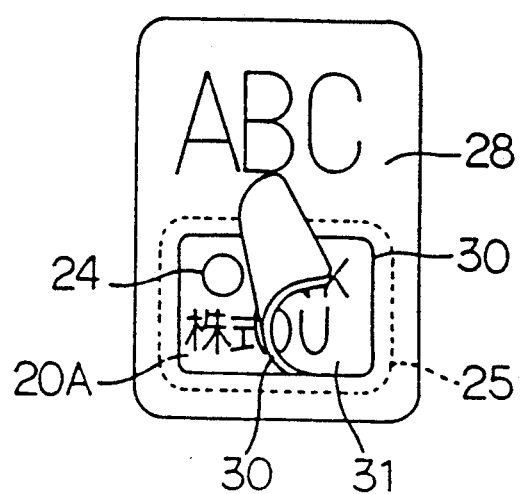
FIG. 4 shows how the labels on the adhesive sheet having the stripping paper is used.

FIGS. 2, 3 and 4 show embodiments of an adhesive label having the stripping paper of the present invention. In FIG. 2, the stripping paper 20A comprises a substrate 20, a mineral coating layer 22 and a silicone film layer 23 respectively corresponding to the substrate 10, the coating layer 12 and the silicone film layer 13 of the embodiment shown in FIG. 1. The stripping paper 20A shown in FIG. 2 has the coating layer 22 formed in advance on the substrate 20, and it will subsequently be subjected to printing process before the silicone film 23 is applied on the coating layer 22. A desired printing 24 is provided on the surface of the coating layer 22 by the printing process, and the solvent-free silicone is applied and hardened on the surface of the coating layer 22 including the printing 24, similarly as in the embodiment shown in FIG. 1. Perforations 25 penetrating the entire thickness are formed by die-cut process to define a region that defines the printing 24.

A labelling paper 27 to be combined with the stripping paper 20A includes plural printed labels 28 defined by perforations 29 which penetrate the entire thickness of the paper and which are formed by die-cut process. The entire back face of the labelling sheet 27 is coated with an adhesive 26. In the inner region of each label 28 is defined another region with perforations 30 penetrating through the entire thickness of the label at a position inside of the perforations 25 on the stripping paper 20A when the labelling paper 27 is pasted on the stripping paper 20A with the adhesive 26. The inner region defined by the perforations 30 constitutes a coupon 31 applied with an adhesive on the back.

The labelling paper 27 of the above construction is pasted on the surface of the stripping paper 20A by the adhesive 26 at the back. Therefore, when the outer margins 32 of the paper 27 are peeled off, the labelling paper 27 with each label 28 is left ready to serve as a sheet of adhesive label attached with the stripping paper. To paste paste the adhesive label onto an object article such as a product, one of the labels 28 is peeled off from the stripping paper 20A. Since the printed area 24 of the stripping paper is separated from the stripping paper 20A by the perforations 25, the printed area 24 defined by the perforations 25 will come off from the stripping paper 20A together with the label 28. The label 28 together with the printed area 24 adhered on its back will be pasted on an object article by means of the adhesive 26 provided on the peripheral area surrounding said printed area 24.

As shown in FIG. 4, if a consumer who buys a product carrying the label 28 peels off the coupon 31 defined by the perforations 30 from the label 28, the coupon 31 can be pasted on a mounting sheet by means of the adhesive 26 which is provided on the back of the coupon 31. On the label 28 stripped off of its portion constituting said coupon 31, there appears the printed area 24 at a position corresponding to where the coupon 31 was located, compensating for the lost message on the coupon 31.

It is noted that the printed area 24 defined by the perforations 25 is slightly larger than the area on the label 28 defined by the perforations 30. As a result, when the portion constituting the coupon 31 is peeled off from the label 28 after the label 28 is pasted on the object article while carrying on its back the printed area 24 of the stripping paper, the printed area 24 can firmly stay adhered on the object article by virtue of the area surrounding the perforations 30 on the label 28 even if the area 24 itself does not have an adhesive on its back, and can still function as a label.

What is claimed is:

1. A stripping paper comprising a paper substrate made of fibers, a mineral powder layer provided on one surface of said substrate with a mineral powder material having a particle size in the range from 0.1 μm to 1.0 μm to provide a smooth surface on said substrate suitable for printing purposes, and a silicone film layer of a substantially uniform film thickness of 1.0 μm or less formed on said mineral powder layer by coating a solvent-free liquid silicone and hardening the same by means of exposure to ultraviolet or electron beam for a brief period of 2 to 6 seconds immediately after said coating, said mineral powder layer being formed as a blocking layer against the infiltration of said liquid silicone into said substrate.

2. The stripping paper as claimed in claim 1, wherein the surface of said mineral powder layer is printed, and said mineral powder layer surface including said printed area is covered by said silicone film.

3. The stripping paper as claimed in claim 1 comprising a second mineral powder layer provided on a reverse surface of said substrate so that a double side coated base paper is formed by said first and second mineral powder layers and said substrate, said base paper having an air permeability of 600 sec/100 cc or more and a total basis weight of 70 g/m² or more.

4. The stripping paper as claimed in claim 1 wherein said silicone film layer is formed by coating said liquid silicone in an amount of 0.5 g/m².

5. An adhesive sheet comprising:
a sheet material provided with a print on a front surface thereof and adhesive layer on a back surface thereof; and
a stripping paper composed of a paper substrate made of fibers, a mineral powder layer provided on one surface of said substrate with a mineral powder material having a particle size in the range from 0.1 μm to 1.0 μm to provide a smooth surface on said substrate suitable for printing purposes, and a silicone film layer of a substantially uniform film thickness of 1.0 μm or less formed on said mineral powder layer by coating a solvent-free liquid silicone and hardening the same by means of exposure of ultraviolet or electron beam for a brief period of 2 to 6 seconds immediately after said coating, said mineral powder layer being formed as a blocking layer against the infiltration of said liquid silicone into said substrate;
said sheet material being laminated with said adhesive layer on the surface of said silicon film layer of said stripping paper.

6. An adhesive sheet comprising:
a sheet material provided with a first print on a front surface thereof and adhesive layer on a back surface thereof; and
a stripping paper composed of a paper substrate made of fibers, a mineral powder layer provided on one surface of said substrate with a mineral powder material having a particle size in the range from 0.1 μm to 1.0 μm to provide a smooth surface on said substrate suitable for printing purposes, and a silicone film layer of a substantially uniform film thickness of 1.0 μm or less formed on said mineral powder layer by coating a solvent-free liquid silicone and hardening the same by means of exposure to ultraviolet or electron beam for a brief period of 2 to 6 seconds immediately after said coating, said mineral powder layer being formed as a blocking layer against the infiltration of said liquid silicone into said substrate;
said sheet material being laminated with said adhesive layer on the surface of said silicon film layer of said stripping paper;
said mineral powder layer being provided with a second print on the surface thereof;
said stripping paper having a first die-cut perforation enclosing a first area of said second print; and
said sheet material having a second die-cut perforation enclosing an inside area of said first area.

* * * * *